Oct. 11, 1927.  
F. HUMPHRIS  
1,645,383  
SAFETY CLUTCH USED IN PRESSES, MACHINERY, SHAFTING, AND THE LIKE  
Filed Nov. 8, 1926  
4 Sheets-Sheet 1
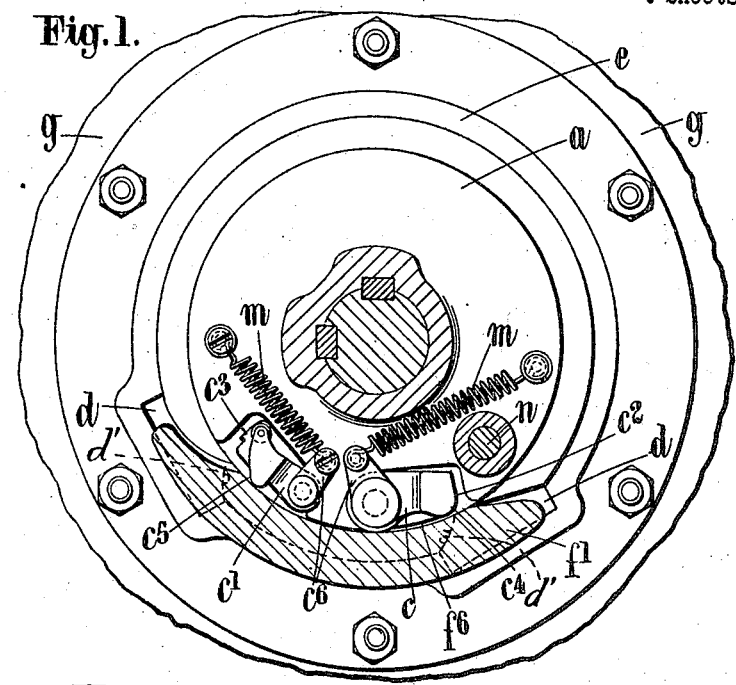
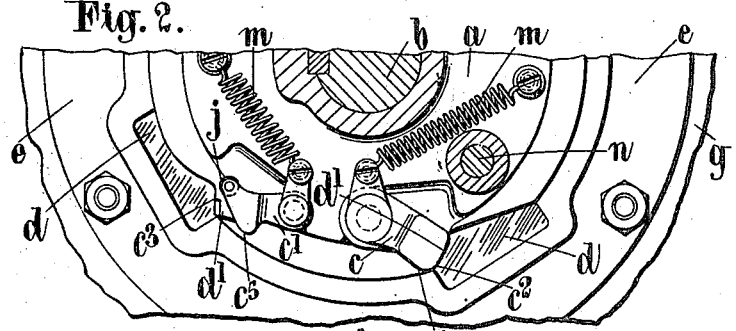
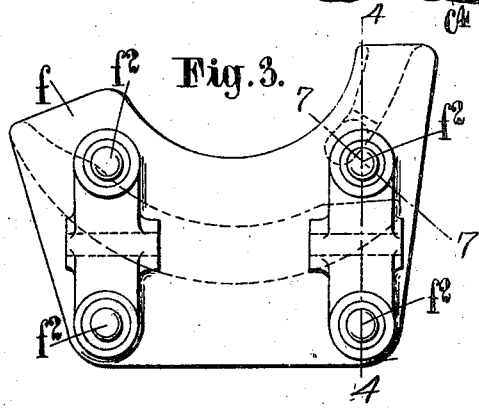
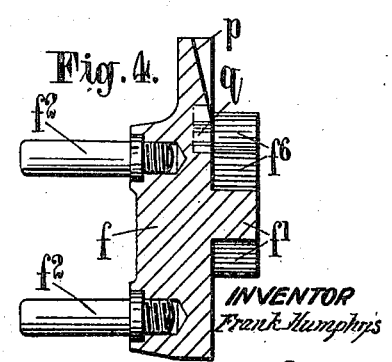
INVENTOR  
Frank Humphris  
BY  
ATTORNEY Oct. 11, 1927.
F. HUMPHRIS
1,645,383
SAFETY CLUTCH USED IN PRESSES, MACHINERY, SHAFTING, AND THE LIKE
Filed Nov. 8, 1926 4 Sheets-Sheet 2
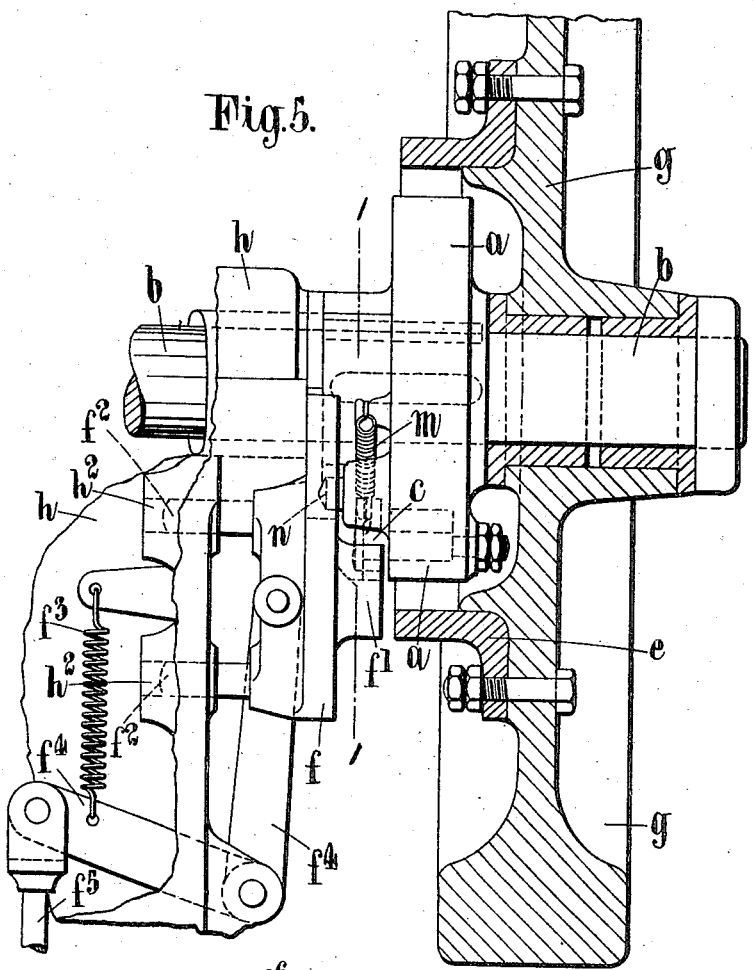
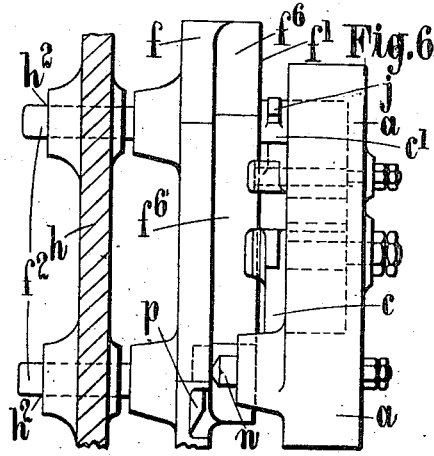
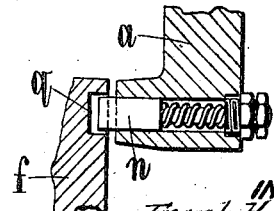
INVENTOR
Frank Humphris
BY
ATTORNEY

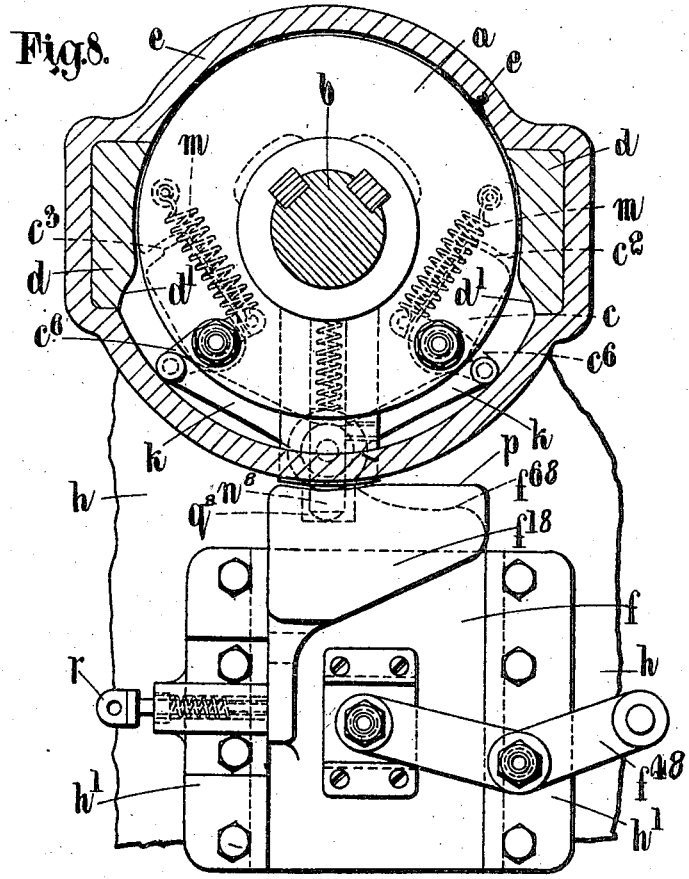

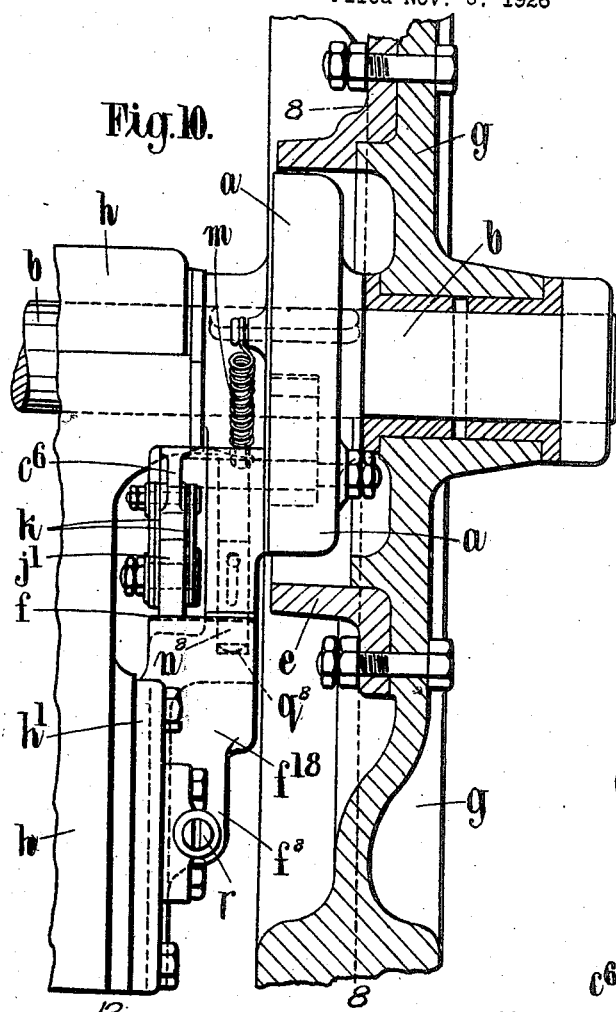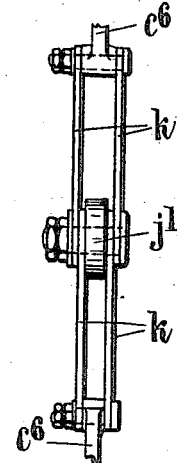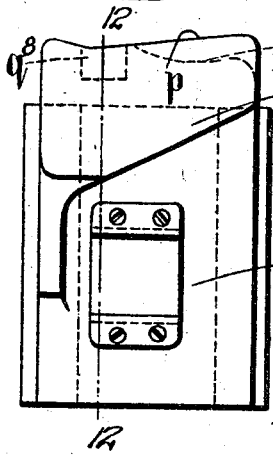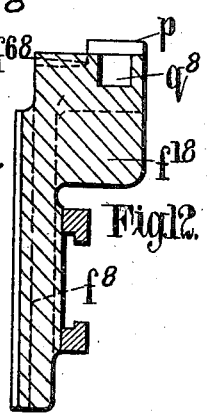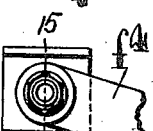

Patented Oct. 11, 1927.

1,645,383

UNITED STATES PATENT OFFICE.

FRANK HUMPHRIS, OF PARKSTONE, ENGLAND.

SAFETY CLUTCH USED IN PRESSES, MACHINERY, SHAFTING, AND THE LIKE.

Application filed November 8, 1926, Serial No. 147,151, and in Great Britain October 21, 1925.

This invention relates to improvements in safety-clutches for use on presses, machinery, shafting and the like, hereinafter called the machine, where it is desired to give either a single or a number of revolutions to a driven shaft or member for a single or a number of movements to one or more working parts of a press or other machine.

According to this invention a clutch is provided having two spring-actuated, partially-rotatable and pivotally-mounted pawls, preferably with stepped engaging or contacting-faces, which pawls are suitably mounted on a driven-member or disc so that they can engage with another or driving-member or ring, which preferably, but not necessarily, has stepped contacting or engaging-faces to coact either with the stepped or other faces on the pawls. The driving-faces are concentric to the axes around which the said pawls turn, and through the medium of the said pawls the driving-member is capable of imparting motion through one pawl in one direction and through the other pawl in an opposite direction to the said driven-member.

To disengage said pawls from, and hold them out of engagement with the driving-member, there is provided a pawl-disengaging cam-member or slide, hereinafter called the pawl-cam-member, which is slidably-mounted in guides and provided with one or more cam-faces or paths, one of which serves to engage with the protuberances or cams on the said pawls or alternatively with one or more rollers mounted on said pawls. Or one or more rollers, through the medium of links, may operate the said pawls in such a manner as to cause them to disengage from contacting-faces of the driving-member or ring and the other of the said cam-faces or paths on the pawl-cam-member serves to guide an arresting-stop or stops into one or more recesses or slots in the face of the said pawl-cam-member for the purpose of holding the driven-members at rest. The pawl-cam-member or slide is moved to permit of engagement or disengagement of the clutch, by means of levers or the like, and these are held by one or more spring controlled-bolts or detents or the like in any desired position and in known manner so that only one or any number of revolutions or operations of the clutch occur.

In practice it has been found that clutches of the known sliding bolt-pin type tend to lock in position and thus cause further movement or repetition of the ram of a press or like machine after the operator has moved the control-lever to the safety position. It has also been found in clutches of the single-pawl type that the pawl, when making contact with its mating-member, strikes it forcibly and rebounds therefrom or drives the member (known as the driven-member) forward, thus breaking contact with it, with the result that either a second hammer-like blow is given to the driven-member or said driven-member is accelerated and travels forward at great risk to the operator. Accordingly, such a clutch, when fitted to a press or like machine, requires brakes to prevent the pressure-mechanism, ram or the like, from falling to the bottom of or making all or a part of its stroke.

It is with a view to overcoming the hereinbefore mentioned disadvantages of the bolt-pin and single-pawl type of clutches that the present invention has been devised.

In order that the invention may be clearly understood and readily carried into practice it is hereinafter described with reference to the accompanying drawings in which:—

Figure 1 is a part elevational view of a press or the like machine taken on the line 1—1 Figure 5, showing the pawls held out of engagement with the driving-member or ring by the cam-faced extension-piece, which extension piece as well as the driven-shaft, boss of driven-shaft, stop and boss therefor are shown in section.

Figure 2 is a partial view of Figure 1 with the cam-faced extension-piece removed showing the pawls in engagement with the abutments in the driving-member or ring.

Figure 3 is a face view of the pawl-cam-member.

Figure 4 is a sectional view on the line 4—4 Figure 3.

Figure 5 is a side elevational view of a press, partly in section, showing one form of the invention with the pawl-cam-member in the position where it disengages the pawls from the driving-member or ring.

Figure 6 is a partial plan view of part of Figure 5 showing the pawl-cam-member out of engagement with the pawls.

Figure 7 is a partial sectional view on an enlarged scale, on the line 7—7 Figure 3.

Figure 8 is a view, partly in elevation and partly in section, showing another form of clutch taken on the line 8—8 Figure 10. In this view the pawl-cam-member is shown in contact with a roller in the position where it holds the pawls out of engagement with the driving-member and with the stop in position in a recess holding the driven-member at rest.

Figure 9 is a partial view of Figure 8 showing the position of the pawl-cam-member when it is out of engagement with the roller and with the pawls in engagement on the abutments in the driving-member or ring, or in the position they are in when the driven-member, pawls, so-called toggle-links and the rollers thereon rotate in either direction with the driving-member or ring.

Figure 10 is a view, partly in section and partly in elevation, of the mechanism shown in Figure 8, showing the pawl-cam-member in the position where it disengages the pawls from the driving-member.

Figure 11 is a face elevation of the pawl-cam-member shown in Figures 8, 9 and 10.

Figure 12 is a sectional view, on the line 12—12 Figure 11, showing a T-slot into which a slide of the known kind, as shown in Figures 14 and 15, slides and fits.

Figure 13 is a plan view of the toggle or links hereinafter referred to.

Figure 14 is a view of a slide and part of a lever used to control the pawl-cam-member shown in Figures 8 to 12.

Figure 15 is a cross-sectional view on the line 15—15 on Figure 14.

Like letters of reference refer to like parts throughout the drawings.

Figures 1 to 7 of the drawings illustrate one convenient embodiment of the invention applied to a press or like machine, wherein a driven-member or disc $a$, is secured on a driven-shaft or member $b$, of the machine. On this driven-member or disc $a$, there are pivotally-mounted two pawls $c$, and $c'$, of substantially bell-crank lever form, the contacting-faces $c^2$ and $c^3$ of which are arranged remote one from the other, so that they operate in opposite directions, i. e., the contacting or engaging-faces $c^2$, and $c^3$, of the said pawls $c$, and $c'$, are so set in relation one to the other that, when they are in engagement with abutment-faces $d'$ of abutments $d$, in the driving-member or ring $e$, motion can be imparted to the driven-member or disc $a$, and its coacting elements in either direction.

To disengage the said pawls $c$, and $c'$, from the abutments $d$, on the driving-member $e$, the said pawls $c$, and $c'$, are caused to rock on their pivots by a cam-faced extension-piece $f'$, on the pawl-cam-member $f$, and springs $m$ connected to said pawls and to the driven member $a$ tend to move said pawls $c$, and $c'$, toward the driving-member $e$, and to cause their contacting faces $c^2$ and $c^3$ to engage with the abutment-faces $d'$ of the driving-member $e$. The driving-member or ring $e$, may be integral with a fly-wheel or other driving element $g$, or may be a separate unit attached by means of bolts, screws or the like to such fly-wheel or driving-element $g$, of the machine; but when the driving-member or ring $e$, is not coupled to the driven-member $a$, by the said pawls $c$, and $c'$, the said driving-member $e$ is free to make independent rotation.

The pawl-cam-member $f$, is so mounted that pins $f^2$ provided on the said pawl-cam-member $f$, will slide in guides or holes $h^2$ (Figs. 5 and 6) in any independent fixture located adjacent to the clutch, in such a manner that said cam-member $f$, is capable of sliding in a direction parallel to the axis of the shaft $b$, on which the driven-member $a$, is mounted.

The said pawl-cam-member $f$ is controlled by one or more springs $f^3$, and by levers $f^4$, and rods $f^5$, of the known kind. The operation of this mechanism is as follows:—The levers $f^4$ move the said pawl-cam-member $f$, in a direction which will cause it to slide and bring its cam face $f^6$ into contact with the protuberances $c^4$, and $c^5$, one on each of the pawls $c$, and $c'$, when the driven-member $a$ and the driving-member $e$, are rotating in either direction and also cause the cam face $f^6$ to make contact with a roller $j$, carried by the pawl $c'$, when the said members are rotating in clockwise direction (Figure 1) the cam face $f^6$ will engage first with the roller $j$, on the pawl $c$, then with the protuberance $c^5$ of said pawl, and afterwards with the protuberance $c^4$ of the pawl $c$. When the said pawl-cam-member $f$, is moved in the other or opposite direction by means of the levers $f^4$, and rods $f^5$, then the cam face $f^6$ of the pawl-cam-member $f$, moves out of contact with the protuberances $c^4$, and $c^5$, on said pawls $c$, and $c'$, and the spring or springs $m$ cause the said pawls $c$, and $c'$, to engage the contacting-faces $d'$, of the driving-member $e$, so that the driving member will impart motion to the driven-member $a$.

To cause the driven-member $a$ to stop or remain at rest, the pawl-cam-member $f$, is engaged preferably by one or more spring-impelled arresting-stops $n$, (Figs. 5 and 7) carried by and adapted to project from the face of the driven-member or disc $a$, and engaging a recess $q$ in the opposed face of the pawl-cam-member $f$ to arrest the rotation of the driven-member $a$, immediately after the pawls $c$, and $c'$, have been withdrawn from engagement with the abutting-faces $d'$. The said pawl-cam member $f$ also has one or more cam faces $p$ (Fig. 6) which terminate at or lead into one or more recesses $q$ formed in the said member, these cam faces $p$ serving to guide the arresting stop or stops $n$ into the recess or recesses $q$ in order to stop any motion of the driven member $a$ and the concomitant parts controlled thereby. The said pawl-cam-member $f$, is preferably, but not necessarily, impelled or slidably-moved so that it will disengage the pawls $c$, and $c'$, when required, by means of the resilient energy supplied by the said spring or springs $f^3$, alone since the spring-controlled levers $f^4$, can effect this movement.

The clutch-mechanism is designed to enable a single movement, or two or more movements, cycles or revolutions, or continuous movement to be given to the driven member $a$ by moving the pawl-cam member $f$ as required.

When the safety-clutch of this invention is used on presses, machinery, shafting and the like, it is unnecessary to provide any form of brake, such as ordinarily employed for arresting the rotation or movement of the reciprocating or rotating parts of the machine which are controlled by the driven-member $a$, because the arresting stop or stops $n$ serve to bring to rest and also to retain at rest and in the desired position the parts controlled by the said driven member $a$, and these said parts remain at rest until the stop or stops $n$, are set free by the operations of the pawl-cam-member $f$, so as to permit one or more cycles or operations of the driven-member $a$, and the parts it controls to take place.

The safety-clutch is so constructed that it will couple the driven and driving-members $a$, and $e$, rigidly together so that they will drive or be driven in either a forward or reverse direction of rotation or of movement. To accomplish this or allow it to occur, the pawl-cam-member $f$, is so constructed that it will free the pawls $c$ and $c'$, or allow them to engage with the abutments $d$ of the driving-member $e$, irrespective of the direction of movement or rotation of the said driving-member $e$.

Either the whole of the surface of each pawl $c$, or $c'$, or a sufficient part thereof which serves to abut on the abutment faces $d'$ is formed so as to be concentric to the centre around which said pawl turns or partially rotates, as shown by the pawl $c$. Or a stepped-part, such as the stepped part of the pawl $c'$, is eccentric to the axis of the pawl and has its center of movement a short distance away from the true axis or centre.

There is what may be described as the driving-pawl, usually $c$, and the follower or retaining-pawl, usually $c'$, the latter having a step part formed thereon, so that, when the driving-pawl $c$, makes contact with an abutment $d$, a recoil takes place and this prevents concurrent engagement of the pawls. To ensure concurrent engagement of the said pawls it has been found in practice advantageous to step the follower-pawl which gives the desired results, because as soon as the driving-pawl has taken the full driving load steadily the stepped-pawl immediately makes full engagement with the abutment with which it coacts and thus prevents the slightest independent circular movement in either direction of both the driving and driven members of the clutch as they rotate together.

According to the embodiment of the invention shown in Figs. 8, 9 and 10, the pawl-cam member $f^8$ is mounted to slide radially of the axis of the shaft $b$, instead of parallel to the latter as in Figs. 1 to 6, such radial movement being effected by a lever $f^{48}$. The cam face $f^6$ of the extension piece $f^{18}$ of the pawl-cam member $f^8$, in its movement toward the axis of the shaft $b$, contacts with a roller $j'$ which is connected by pairs of toggle links $k$ (Figs. 8, 10 and 13) to extensions $e^6$ of the pawls $c$ and $c'$, thus rocking the pawls $c$ and $c'$ on their axes to move their contacting faces $c^2$ and $c^3$ out of position to engage the abutments $d$. The spring impelled arresting stop $n^8$ carried by the driven member $a$ moves radially of said member and is adapted to enter a recess $q^8$ in the cam face $f^{68}$ of the pawl-cam member $f^8$. The pawl-cam member $f^8$ may be held out of engagement with the roller $j'$ by a spring-actuated bolt $r$ mounted in one of the guides $h'$ of the pawl-cam member and adapted to enter a recess in one edge of the pawl-cam member $f^8$.

I claim:

1. A safety clutch comprising driving and driven members, a pawl movable radially of said members and forming a driving connection therebetween, the driven member having an arresting stop, a sliding cam having a recess therein, means for moving the cam to a position in which the recess is in the path of the stop, said cam having a cam face along which said stop travels before entering said recess, and means for moving the cam to a position in which the recess is out of the path of the stop.

2. A safety clutch comprising driving and driven members, one of said members having oppositely directed abutment faces, pawls on the other member movable into and out of contact with the abutment faces, an arresting stop on the driven member, a sliding cam having a recess therein to receive the said stop, means for moving the cam into position to receive the stop in the recess and hold the pawls out of engagement with the abutment faces and means for withdrawing the cam to release the said pawls and stop.

3. A safety clutch comprising driving and driven members, said driving member having oppositely directed abutment faces, a pair of oppositely directed pawls on said driven member and normally movable into position to engage said abutment faces, an arresting stop on the driven member, and a cam having a recess and movable into position to hold said pawls out of position to engage said abutment faces and to bring said recess into position to receive said stop, said cam having a cam face along which said stop travels before entering said recess.

4. A safety clutch comprising a driving member and a driven member, said driving member having oppositely directed abutment faces, a pair of oppositely directed pawls carried by said driven member and normally movable into position to engage said abutment faces, an arresting stop on the driven member, a sliding cam having a recess and movable to bring said recess into position to receive said stop, and to hold said pawls out of position to engage said abutment faces, said cam also having a cam face along which said stop travels before entering said recess, and means for moving said cam to release said stop after it has entered said recess.

5. A safety clutch comprising a driving member and a driven member, one of said members having oppositely directed abutment faces, a pair of pawls on the other member respectively urged into contact with said abutment faces, an arresting stop on the driven member, a sliding cam having a recess to receive said stop, means for moving the cam into position in which the stop is held in said recess and the pawls are simultaneously held out of engagement with said abutment faces, and means for retracting said cam to simultaneously release the said pawls and said stop.

FRANK HUMPHRIS.